(12) United States Patent
Guhl et al.

(10) Patent No.: US 10,060,481 B2
(45) Date of Patent: Aug. 28, 2018

(54) GEARED MOTOR (71) Applicant: Lenze Drives GmbH, Extertal (DE)

(72) Inventors: Ralf Guhl, Aerzen (DE); Andreas Hilkemeier, Doerentrup (DE); Juergen Huette, Barntrup (DE); Arno Senke, Extertal (DE)

(73) Assignee: Lenze Drives GmbH, Extertal (DE)

( * ) Notice: Subject to any disclaimer, the term of this patent is extended or adjusted under 35 U.S.C. 154(b) by 584 days.

(21) Appl. No.: 14/424,932

(22) PCT Filed: Aug. 20, 2013

(86) PCT No.: PCT/EP2013/067299
§ 371 (c)(1),
(2) Date: Feb. 27, 2015

(87) PCT Pub. No.: WO2014/033008
PCT Pub. Date: Mar. 6, 2014

(65) Prior Publication Data
US 2015/0226268 A1    Aug. 13, 2015

(30) Foreign Application Priority Data
Aug. 31, 2012 (DE) .................. 10 2012 215 509

(51) Int. Cl.
*F16D 1/00* (2006.01)
*F16D 1/06* (2006.01)
*H02K 7/116* (2006.01)

(52) U.S. Cl.
CPC ............. *F16D 1/06* (2013.01); *H02K 7/116* (2013.01); *Y10T 29/49963* (2015.01); *Y10T 403/1608* (2015.01)

(58) Field of Classification Search
CPC ......... Y10T 74/19684; Y10T 403/1608; Y10T 403/648; Y10T 403/587; Y10T 74/2186;
(Continued)

(56) References Cited

U.S. PATENT DOCUMENTS 293,734 A * 2/1884 Harrison ................ F16L 23/08
285/366
1,233,171 A * 7/1917 Berry .................... F16L 25/065
238/333
(Continued)

FOREIGN PATENT DOCUMENTS

DE     1 450 122 A1    2/1969
DE     203 19 356 U1   6/2005
(Continued)

OTHER PUBLICATIONS

International Search Report (PCT/ISA/210) dated Dec. 23, 2014, with English translation (Seven (7) pages).

*Primary Examiner* — Michael P Ferguson
*Assistant Examiner* — Matthew R McMahon
(74) *Attorney, Agent, or Firm* — Crowell & Moring LLP (57) ABSTRACT

A geared motor has an electric motor with an output shaft and a gear mechanism, the electric motor and the gear mechanism being adapted to one another such that a bearing plate of the electric motor can be fastened directly to an input shaft side of a housing of the gear mechanism. A coupling thread, which surrounds the output shaft for producing a threaded connection, is provided for fastening the bearing plate to the input shaft side. To that end, a securing section is provided which, in the fastened state, prevents a relative rotation of the housing of the gear mechanism with respect to the bearing plate in a release direction. The securing section is fastened to the bearing plate or to the gear mechanism housing by way of a fastening screw which is screwed into the bearing plate or the gear mechanism housing in a manner which is oriented in the tangential direction of the coupling thread.

5 Claims, 5 Drawing Sheets

(58) Field of Classification Search
CPC . F16D 1/06; H02K 7/116; H02K 5/04; H02K 5/15; F16B 9/026
USPC .................................................. 411/116, 315
See application file for complete search history.

(56) References Cited

U.S. PATENT DOCUMENTS

| | | | | |
|---|---|---|---|---|
| 1,392,363 | A * | 10/1921 | Shannon | F16D 1/08 |
| | | | | 403/261 |
| 3,139,296 | A | 6/1964 | Greene | |
| 4,859,889 | A | 8/1989 | Andrews et al. | |
| 5,178,483 | A * | 1/1993 | Wang | F16D 1/076 |
| | | | | 403/258 |
| 6,166,467 | A * | 12/2000 | Tsai | H02K 5/04 |
| | | | | 310/89 |
| 8,215,884 | B2 * | 7/2012 | Bulow | H01R 13/622 |
| | | | | 411/116 |
| 8,739,863 | B2 * | 6/2014 | Linde | E21B 17/02 |
| | | | | 166/84.1 |
| 2005/0253478 | A1 * | 11/2005 | Masuda | E06B 9/72 |
| | | | | 310/254.1 |
| 2013/0319152 | A1 | 12/2013 | Bea | |
| 2014/0285038 | A1 * | 9/2014 | Hanson | H02K 5/04 |
| | | | | 310/43 |

FOREIGN PATENT DOCUMENTS

| | | |
|---|---|---|
| DE | 10 2005 057 358 B3 | 2/2007 |
| DE | 10 2007 038 522 A1 | 2/2009 |
| DE | 10 2011 077 930 A1 | 12/2012 |
| EP | 0 237 617 A1 | 9/1987 |
| JP | 2001-119894 A | 4/2001 |
| WO | WO 2012/041511 A2 | 4/2012 |

* cited by examiner

GEARED MOTOR

FIELD OF APPLICATION AND PRIOR ART

The invention relates to a geared motor which has an electric motor with an output shaft and a gear mechanism. Here, the electric motor and the gear mechanism are adapted to one another in such a way that a bearing plate of the electric motor can be fastened directly to an input shaft side of a housing of the gear mechanism, a coupling thread which surrounds the output shaft for producing a threaded connection being provided for fastening the bearing plate to the input shaft side of the housing.

A coupling thread of this type for geared motors of the generic type is not known previously from the field of industrial geared motors which are the focus of the present invention. However, it is the subject matter of the subsequently published DE 10 2011 077 930 A1.

JP 2001-119894 A and DE 10 2005 057 358 B3 have disclosed corresponding geared motors of small overall size and low power output.

It has been proven in practice that the coupling of the electric motor and the gear mechanism is difficult in the case of geared motors of the generic type, in particular in the case of large geared motors with a motor power output of greater than 50 W, in particular greater than 500 W, since it is of great importance here to mount the coupling thread with a tightening torque, in order to prevent undesired disconnection of the motor from the gear mechanism. Furthermore, it is desirable to provide a securing means which counteracts the disconnection of the gear mechanism from the motor.

With regard to the abovementioned tightening torque, it has been shown that it can be brought about manually only with considerable lever action and therefore large tools which additionally have to be made available specially for this purpose.

Problem and Solution

It is therefore a problem of the invention to develop a geared motor of the generic type in such a way that it has a simplified assembly capability by way of customary tools and/or an advantageous way to secure against disconnection in the region of the coupling thread.

According to the invention, this problem is solved by virtue of the fact that a securing section is provided on a geared motor according to the invention, which securing section, in the fastened state, prevents a relative rotation of the housing of the gear mechanism with respect to the bearing plate in the release direction of the coupling thread, said securing section being fastened to the bearing plate or to the gear mechanism housing by way of a fastening screw which can be screwed into the bearing plate or the gear mechanism housing in a manner which is oriented in the tangential direction of the coupling thread.

Accordingly, it is provided according to the invention that a special securing section, in particular a thick-walled metal sheet with a hole for the fastening screw, is provided which, in the transition region between the bearing plate and the gear mechanism housing, is screwed to at least one of said two components, said screw connection being carried out by way of the abovementioned fastening screw and a threaded hole for this purpose which extends in the tangential direction in relation to the coupling thread.

Said securing section has two aims. Firstly, it limits the rotational movability of the bearing plate and the gear mechanism housing with respect to one another in the mounted state. Secondly, it is helpful for mounting the electric motor on the gear mechanism.

This will be explained in each case, furthermore, with regard to two possible variants.

In a first variant of the securing section, it is configured as a securing section which is attached fixedly to the bearing plate or to the gear mechanism housing. The securing section itself is therefore immovable with respect to the respective component, that is to say the bearing plate or the gear mechanism housing, or is at least not moved with respect to said component when used as intended during the assembly. In this case, the tangentially oriented screw hole for the fastening screw is provided on the other component. This allows the external thread of the threaded connection to first of all be screwed without a special tool onto the internal thread on the other component in order to produce the threaded connection of the coupling thread. The desired tightening torque for producing the coupled final position is then applied by virtue of the fact that said fastening screw is screwed through an aperture of the securing section into the tangentially oriented threaded hole and in the process the bearing plate of the electric motor and the gear mechanism housing rotate further by a few degrees until the desired final position is reached.

The fastening screw itself is preferably a screw with a customary screw head, in particular with an external hexagon or a hexagon socket. It can be tightened using a simple and standard tool. In order to avoid flexural loadings on the fastening screw, intermediate elements, in particular spherical disks and conical sockets according to DIN 6319, can also be used between the screw head and the securing section, in particular, in the alternative design which will be described in the following text. As an alternative, screws with a spherical section-shaped bearing face can also be used. In this case, the counterface on the securing section is to be provided correspondingly with a spherical section-shaped depression for this purpose.

One alternative to a design of this type with a fixedly attached securing section provides that the securing section is configured as a securing section which is separated from the bearing plate and from the gear mechanism housing and can be screwed fixedly in a first position to the bearing plate or to the bearing housing by means of the fastening screw, with the result that it prevents the movement of the other component in the release direction of the coupling thread in a positively locking manner.

In this preferred variant, the securing section is therefore not a fixed part of one of the two components which are formed by the bearing plate and the gear mechanism housing, but rather is a section which is separate therefrom. It is connected to one of the two components only by means of the fastening screw. During the tightening of the fastening screw, said securing section presses that component, to which it is not screwed fixedly, in the direction of its desired position and in this way brings about the desired tightening torque for reliable coupling of the gear mechanism and the electric motor. As soon as said desired position is reached, the securing section remains in the position which is reached, in order to prevent the components from rotating backward with respect to one another in the release direction of the coupling thread.

The use of a separate securing section advantageous not only during the assembly of the geared motor, but also during dismantling if, according to one advantageous development, the geared motor is configured in such a way that the threaded connection between the electric motor and the gear mechanism can be released starting from the connected state with the utilization of the securing section, it being possible for the securing section to be screwed fixedly in a second position to the bearing plate or the gear mechanism housing for this purpose, with the result that it brings about a release torque between the gear mechanism housing and the bearing plate in the release direction of the coupling thread as a result.

It is therefore provided in this development that a second position is provided, in which the securing section can be attached to the bearing plate or to the gear mechanism housing, a torque being brought about by way of the attachment of the securing section at said second position, which torque is suitable for rotating the gear mechanism and the motor with respect to one another to such an extent, preferably by a few degrees, that subsequently facilitated manual release of the components from one another is possible. The second position, in which the securing section can be attached, is therefore not a position in which the securing section remains permanently when the geared motor is assembled, but rather only an option for releasing the coupling thread in order to dismantle the geared motor.

One particularly advantageous refinement provides that the securing section can be screwed fixedly in the first position and in the second position to the bearing plate or the gear mechanism housing, that, furthermore, two counter-faces for bearing against the securing section in its first and in its second position, respectively, are provided on the other component, to which the securing section is not to be screwed as intended, and that the counterfaces on the other component are spaced apart from one another by a greater extent than the first and the second position of the securing section.

This is advantageously achieved structurally in such a way that at least one lobe is provided on both components, the bearing plate and the gear mechanism housing, in a manner which, points in each case toward one another, said lobe being of smaller size in the circumferential direction on that part, on which the threaded holes or the threaded hole for screwing the securing section fixedly are/is provided.

This measure achieves a situation where, when the securing section is screwed fixedly in its first position to one of the two components, for example the gear mechanism housing, the second component, for example therefore the bearing plate, is rotated with respect to the first component to such an extent that the lobe which is provided on it tangentially protrudes beyond the lobe of the component, to which the securing section is screwed fixedly, in the tightening direction of the thread. As a result, the required starting position is provided which later, by way of the securing section being screwed fixedly in its second position, allows the torque which is required to release the two components to be applied by means of the securing section.

It is advantageous if in each case a plurality of lobes of this type are provided on one or both components, with the result that the securing section can be attached at different locations. As a result, the lobe pair which is most readily accessible from the outside can be used to couple the electric motor and the gear mechanism on a case-by-case basis.

Furthermore, it is considered to be advantageous if the securing section also assumes an additional function. It can thus comprise, in particular, a suspension lug which is satisfactorily suitable for handling the geared motor.

Moreover, the invention also relates to a method for fastening a motor and a gear mechanism to one another in order to form a geared motor, it being possible for the motor and the gear mechanism to be screwed to one another via a coupling thread which surrounds a drive shaft of the motor. This method according to the invention provides that the thread is screwed fixedly to the motor at least in a last phase of the fixed screwing operation by virtue of the fact that a securing section is screwed to the gear mechanism or the motor by means of a fastening screw which can be screwed in the tangential direction of the coupling thread and, as a result, brings about a torque in the tightening direction of the coupling thread onto the other component.

BRIEF DESCRIPTION OF DRAWINGS

Further aspects and advantages of the invention result, apart from the claims, from the following description of one preferred exemplary embodiment of the invention which will be explained using the figures, in which:

DETAILED DESCRIPTION OF THE EXEMPLARY EMBODIMENT

Figure 1:
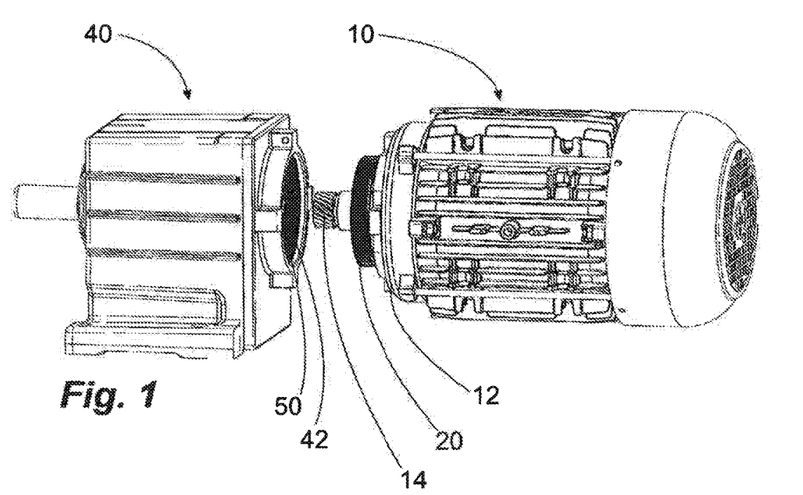
FIG. 1 shows the gear mechanism and the electric motor of a geared motor in the state, in which they are not yet assembled.

FIG. 1 shows a geared motor according to the invention in the state, in which it is not yet assembled. The two main components of the geared motor, the electric motor 10 and the gear mechanism 40, are not yet coupled in this state. A coupling external thread 20 is provided on the bearing plate 12 of the electric motor 10 for coupling of the two components 10, 40, which coupling external thread 20 surrounds an output shaft 14 of the electric motor. In a corresponding manner to this, an attachment opening 42 with a coupling internal thread 50 is provided on the input side of the gear mechanism 40 which is configured in the present case as a spur gear mechanism.

Figure 2:
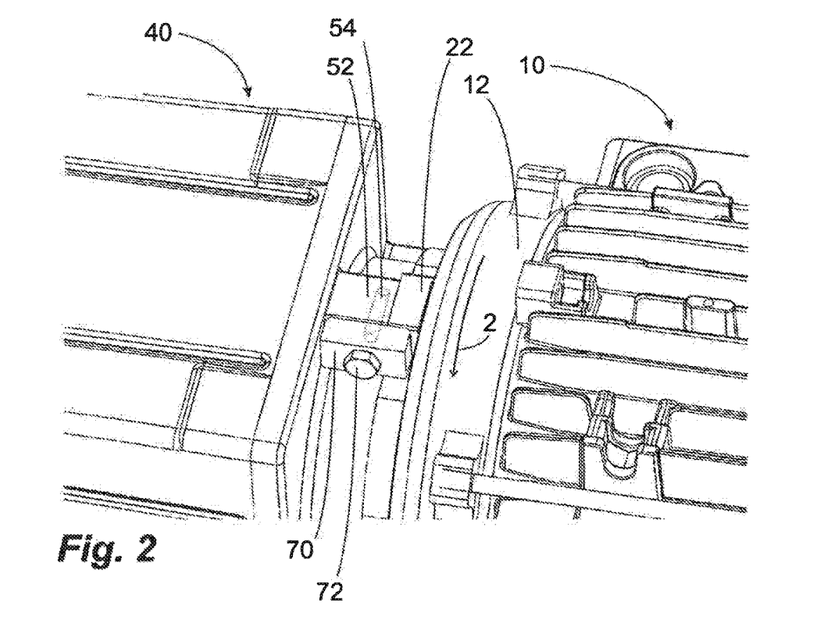
FIG. 2 shows the geared motor which consists of the components from FIG. 1 in the assembled state.

In order to couple the motor 10 to the gear mechanism 40, the motor is screwed into the coupling internal thread 50 of the gear mechanism 40 by means of the coupling external thread 20. FIG. 2 illustrates the coupled state. It can be gathered from said figure, furthermore, that in each case securing lobes 22, 52 are provided on the outer side of the coupling thread 20, 50 both on the bearing plate 12 and on the gear mechanism 40. Said securing lobes 22, 52 are directly adjacent to one another in the assembled state of the geared motor. They have different widths. The securing lobe 22 on the electric motor 10 is somewhat wider in the circumferential direction. The securing lobe 52 on the gear mechanism 40 is penetrated by a tangentially orientated threaded hole 54 which is shown using dashed lines in FIG. 2. Instead of a threaded hole 54, it goes without saying that a threadless through hole and an additional nut can also be used.

In the finally assembled and secured state which is shown in FIG. 2, there is securing against a rotational movement of the motor in the direction of the arrow 2 and therefore in the release direction. Said securing is brought about by way of a securing section 70 which is secured by means of a fastening screw 72 which is screwed into the threaded hole 54. Said securing section 70 extends as far as into the region of the bearing plate 12, as a result of which the securing section 70, in interaction with the securing lobe 22, prevents in a positively locking manner said rotational movement of the electric motor in the release direction 2 occurring.

In addition to the above-described securing, the special advantage of one refinement, in which the securing section 70 is held by way of a screw 72 which is screwed in the tangential direction, lies in the possibility of bringing about a high tightening torque during the assembly by means of said securing section 70.

Figure 3A:
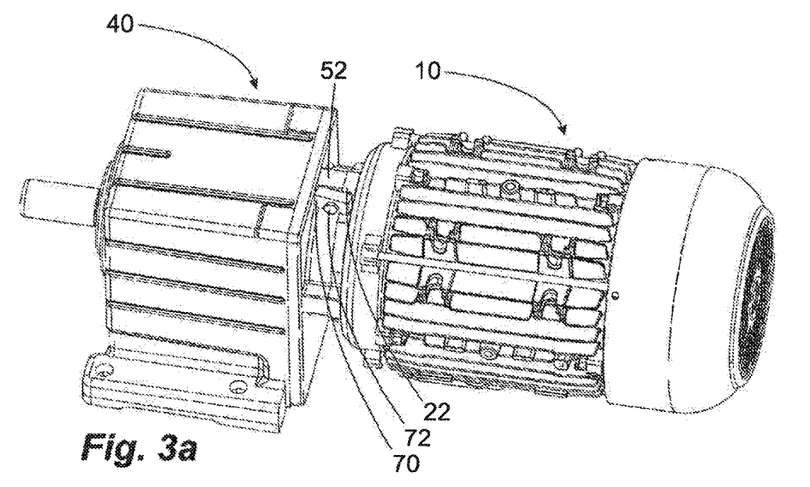
FIGS. 3a and 3b show the geared motor with the motor and gear mechanism already coupled to one another, but before the desired final relative position is reached.
Figure 3B:
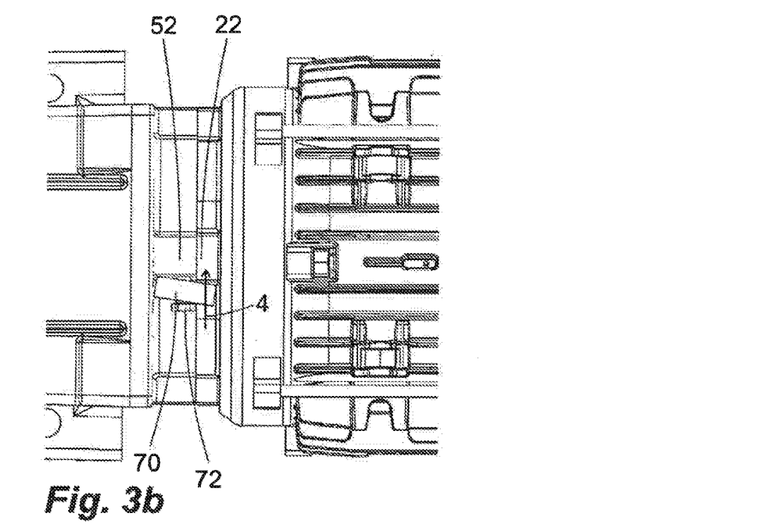

FIGS. 3a and 3b illustrate this FIG. 3a shows the geared motor in a perspective obliquely from above. FIG. 3b shows the transition region between the electric motor 10 and the gear mechanism 40 from above. The relative position which is shown, in which the motor 10 is not yet screwed completely with the external thread 20 into the internal thread 50, can be achieved by virtue of the fact that the motor screwed into the gear mechanism 40 manually and by way of direct handling. Tightening of said thread as far as into the desired final position can scarcely be achieved, however, by way of direct manual handling of the electric motor. Starting from the relative position of FIG. 3a, the last part section of the rotational movement is therefore achieved by virtue of the fact that the securing section 70 is screwed fixedly by means of the fastening screw 72 to the lower side (in relation to FIG. 3a) of the securing lobe 52. Since it extends in the direction of the electric motor 10 and as far as into the region of the securing lobe 22 of the electric motor 10, the securing section 70 presses on the securing lobe 22 of the electric motor during tightening of the screw 72 in the direction of the arrow 4, until the final state of FIG. 4 is reached.

Figure 4:
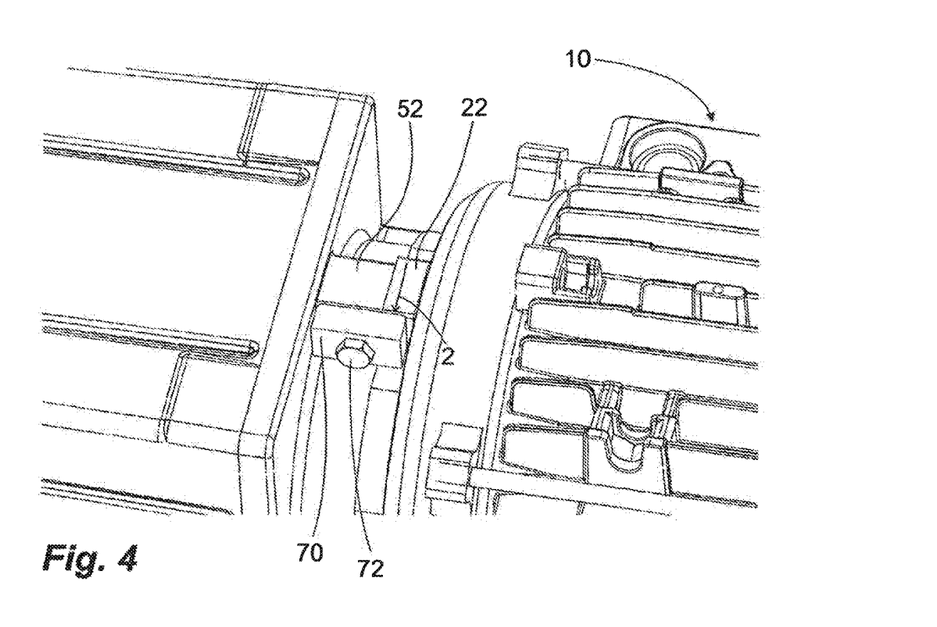
FIG. 4 shows the geared motor in the state, in which it is completely assembled and secured by way of a securing section.

The securing section also preferably remains in said first position of FIG. 4 during operation of the geared motor, in which position it prevents the electric motor rotating backward in the direction of the arrow 2.

As soon as dismantling of the geared motor is to take place, the securing section 70 is released by way of unscrewing of the fastening screw 72. A relative movement between the electric motor 10 and the gear mechanism 40 is now again possible in principle. On account of the high tightening torque which was brought about by the securing section 70 during assembly, disconnection of the motor and the gear mechanism for dismantling purposes is scarcely possible in a purely manual manner and without the use of tools, however.

Figure 5:
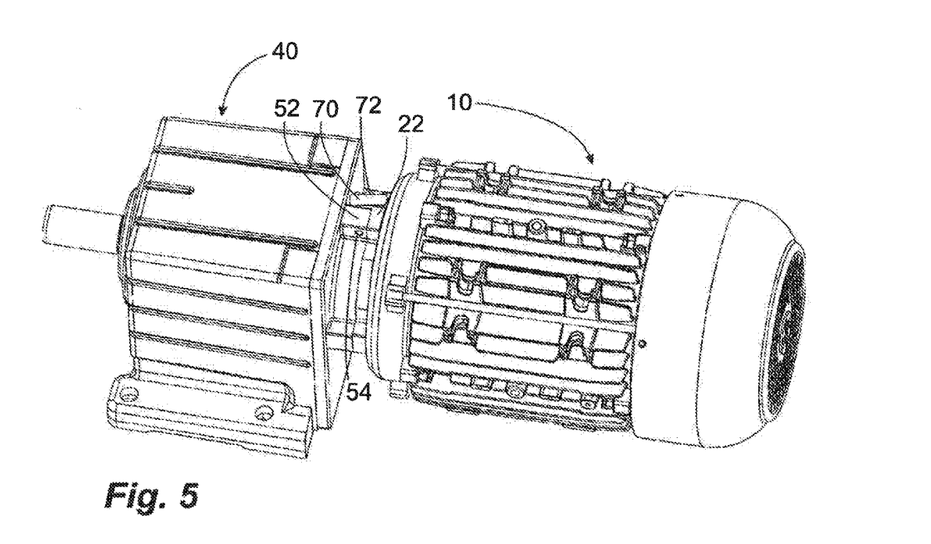
FIGS. 5 and 6 show the use of the securing section for generating a release torque during dismantling.
Figure 6:
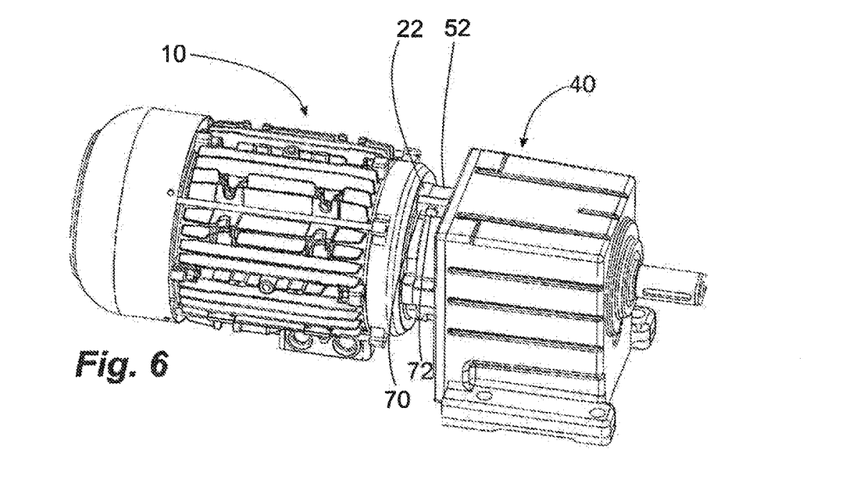

It is therefore provided that the securing section 70 is once again used here. As FIG. 5 illustrates, the securing section is screwed on the opposite side of the securing lobe 52 into the threaded hole 54, a relative movement being imparted to the fastening screw 72 as a result of tightening in a similar manner as previously during assembly, but this time in the release direction. FIG. 6 shows the securing section 70 after its second position has been reached. Starting from this position, it is comparatively simple to screw the electric motor 10 out of the gear mechanism-side coupling internal thread 50.

The greater width of the securing lobe 22 in comparison with the securing lobe 52 therefore allows both a tightening torque and a release torque to be caused as a result of the attachment of the securing section 70 depending on the position, at which it is attached.

Figure 7:
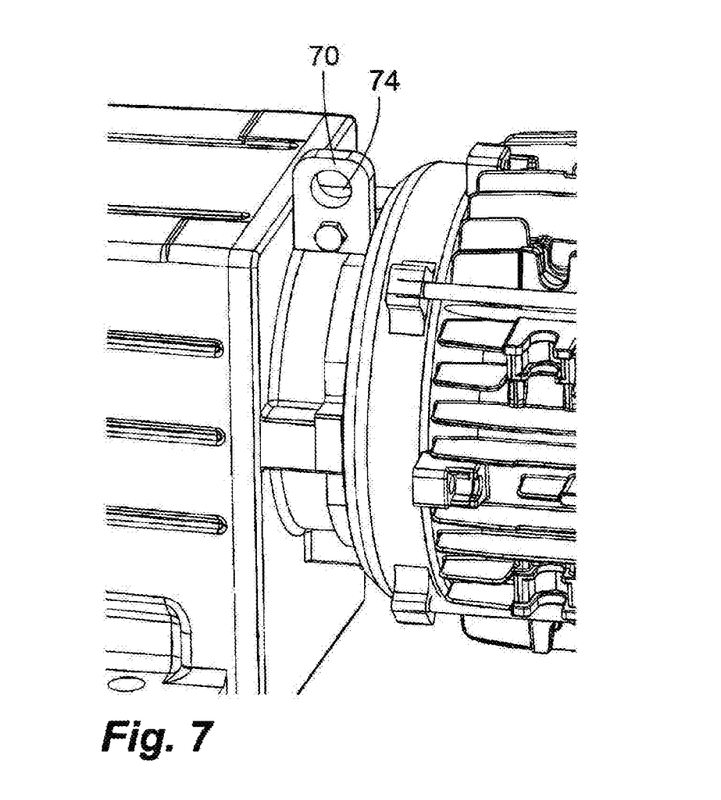
FIG. 7 shows an alternative design of the securing section.

FIG. 7 shows one modification, in which the securing section 70 at the same time has a suspension lug 74 for handling the geared motor. The use of said securing section 70 is otherwise identical to that described above.

The invention claimed is:

1. A geared motor, comprising:
   an electric motor with an output shaft,
   a gear mechanism, the electric motor and the gear mechanism being adapted to one another such that a bearing plate of the electric motor is fastenable directly to an input shaft side of a housing of the gear mechanism, and
   a coupling thread which surrounds the output shaft for producing a threaded connection, the coupling thread being provided for fastening the bearing plate to the input shaft side, wherein
   a securing section is provided which, in the fastened state, prevents a relative rotation of the housing of the gear mechanism with respect to the bearing plate in a release direction, said securing section being fastened to the bearing plate or to the gear mechanism housing by way of a fastening screw which is screwed into the bearing plate or the gear mechanism housing in a manner which is oriented in a tangential direction of the coupling thread,
   the securing section is configured as a securing section which is separated from the bearing plate and from the gear mechanism housing and is screwable fixedly in a first position to the bearing plate or to the gear mechanism housing by the fastening screw, with the result that it prevents movement of the other component in the release direction of the coupling thread in a positively locking manner, and
   the threaded connection between the electric motor and the gear mechanism is releasable starting from the fastened state with utilization of the securing section, it being possible for the securing section to be screwed fixedly in a second position to the bearing plate or the gear mechanism housing for this purpose, such that it brings about a release torque between the gear mechanism housing and the bearing plate in the release direction of the coupling thread as a result.

2. The geared motor as claimed in claim 1, wherein
   the securing section is screwable fixedly in the first position and in the second position to the bearing plate or the gear mechanism housing,
   two counterfaces for bearing against the securing section are provided on the other component, and
   the counterfaces are spaced apart from one another by a greater extent than the securing section in its first position in comparison with its second position.

3. The geared motor as claimed in claim 2, wherein the securing section has a suspension lug for handling the geared motor.

4. The geared motor as claimed in claim 1, wherein the securing section has a suspension lug for handling the geared motor.

5. A geared motor, comprising:
   an electric motor with an output shaft,
   a gear mechanism, the electric motor and the gear mechanism being adapted to one another such that a bearing plate of the electric motor is fastenable directly to an input shaft side of a housing of the gear mechanism, and
   a coupling thread which surrounds the output shaft for producing a threaded connection, the coupling thread being provided for fastening the bearing plate to the input shaft side,
   wherein a securing section is provided which, in the fastened state, prevents a relative rotation of the housing of the gear mechanism with respect to the bearing plate in a release direction, said securing section being fastened to the bearing plate or to the gear mechanism housing by way of a fastening screw which is screwed into the bearing plate or the gear mechanism housing in a manner which is oriented in a tangential direction of the coupling thread, wherein the gear mechanism housing comprises a first securing lobe extending towards the bearing plate, and the bearing plate comprises a second securing lobe extending towards the gear mechanism housing; and wherein the securing section comprises a securing block having a through-hole and the first or second securing lobe comprises a threaded hole, wherein, in the fastened state, the fastening screw passes through the through-hole of the securing block and is received in the threaded hole such that the securing block is secured to the first or second securing lobe and abuts the other securing lobe, thereby preventing relative rotation of the gear mechanism housing with respect to the bearing plate in the release direction.

* * * * *